United States Patent
Wu

(10) Patent No.: US 10,793,227 B2
(45) Date of Patent: Oct. 6, 2020

(54) COLUMN FLOATER WITH EXTENDED CYLINDER AND RING BUOY-GROUP

(71) Applicant: Zhirong Wu, Beijing (CN)

(72) Inventor: Zhirong Wu, Beijing (CN)

( * ) Notice: Subject to any disclaimer, the term of this patent is extended or adjusted under 35 U.S.C. 154(b) by 0 days.

(21) Appl. No.: 16/335,430

(22) PCT Filed: May 19, 2017

(86) PCT No.: PCT/CN2017/085052
§ 371 (c)(1),
(2) Date: Mar. 25, 2019

(87) PCT Pub. No.: WO2018/058975
PCT Pub. Date: Apr. 5, 2018

(65) Prior Publication Data
US 2019/0217919 A1    Jul. 18, 2019

(30) Foreign Application Priority Data
Sep. 30, 2016   (CN) .......................... 2016 1 0867431

(51) Int. Cl.
*B63B 1/02*       (2006.01)
*B63B 35/44*      (2006.01)
(Continued)

(52) U.S. Cl.
CPC ................ *B63B 1/02* (2013.01); *B63B 1/048* (2013.01); *B63B 7/02* (2013.01); *B63B 35/44* (2013.01);
(Continued)

(58) Field of Classification Search
CPC ......... B63B 35/00; B63B 35/08; B63B 35/44; B63B 35/4413; B63B 39/00; B63B 39/06;
(Continued)

(56) References Cited

U.S. PATENT DOCUMENTS

| 6,945,736 B2 | 9/2005 | Smedal et al. |
| 7,086,810 B2 | 8/2006 | Masetti et al. |

(Continued)

FOREIGN PATENT DOCUMENTS

| GB | 2243118 A | 10/1991 |
| WO | 2012/104309 A2 | 8/2012 |

OTHER PUBLICATIONS

Haereid et al, OTC 11901 SEMO FPU: The Efficient Floater, pp. 121-135.

*Primary Examiner* — Lars A Olson
(74) *Attorney, Agent, or Firm* — Arent Fox LLP; Michael Fainberg

(57) ABSTRACT

This invention is directed to a column floater with extended cylinder and a ring buoy-group, which comprises an upright buoy at a water surface, an extended cylinder, a positioning system and a topsides. The top of the upright buoy is above the water surface and a moonpool is either set or not in the center of the upright buoy through the top to the bottom. The extended cylinder, connecting to the bottom of the upright buoy and extending downwards, includes two types of fixed and sliding to form a column floater with fixed extended cylinder and a column floater with sliding extended cylinder respectively. The positioning system is one or two combined of mooring system and DP system. The column floater with extended cylinder is a new type floating platform with multi-purpose, combining advantages of the spar platform and the current cylindrical FPSO, high performance, safety and reliability.

17 Claims, 8 Drawing Sheets

(51) Int. Cl.
*B63B 75/00* (2020.01)
*B63B 1/04* (2006.01)
*B63B 7/02* (2020.01)
*B63B 39/06* (2006.01)

(52) U.S. Cl.
CPC ........ *B63B 75/00* (2020.01); *B63B 2035/442* (2013.01); *B63B 2039/067* (2013.01); *B63B 2207/02* (2013.01); *B63B 2241/20* (2013.01); *Y02A 40/81* (2018.01)

(58) Field of Classification Search
CPC ........... B63B 21/00; B63B 21/50; B63B 1/00; B63B 1/02; B63B 75/00
USPC ..... 114/256, 264, 265, 266; 405/205, 223.1, 405/224
See application file for complete search history.

(56) References Cited

U.S. PATENT DOCUMENTS

| | | |
|---|---|---|
| 7,958,835 B2 | 6/2011 | Srinivasan |
| 8,544,404 B2 | 10/2013 | Santos Costa et al. |
| 9,079,644 B2 | 7/2015 | Aarsenes et al. |
| 9,850,636 B2 | 12/2017 | Wu |
| 2010/0014304 A1 | 1/2010 | Frey et al. |

US 10,793,227 B2

COLUMN FLOATER WITH EXTENDED CYLINDER AND RING BUOY-GROUP

CROSS-REFERENCE TO RELATED APPLICATIONS

This application is the U.S. National Stage Application of International Patent Application No. PCT/CN2017/085052, filed on May 19, 2017, which claims priority to Chinese Patent Application No. CN2016/10867431.7, filed on Sep. 30, 2016, the contents of each of which is incorporated herein by reference in its entirety.

FIELD OF INVENTION

The present invention relates to the offshore engineering technical field, in particular to a column floater for multi-purpose which can be used for offshore oil and gas exploration and development and production, offshore power generation, liquid storage and supply, deep-water aquaculture, tourism/sightseeing and others.

DESCRIPTION OF THE PRIOR ARTS

The existing technology of the column floater can normally be divided into two categories, one is the deep-draft SPAR platform, and the other is the cylindrical FPSO as the representative of the shallow draught, large outer diameter cylindrical floating platform.

The SPAR platform is characterized by: draft is very deep, usually close to 200 meters; the waterline area is small, the diameter of the cylinder is usually 30 to 40 meters; the center of buoyancy is higher than the center of gravity, which guarantees the stability of the platform; and usually cannot store liquids. Of these, the classic SPAR is normally a kind of Column Floater with Fixed Extending Cylinder without the anti-motion structure surrounding the bottom of the platform. The advantages of the SPAR platform are: because of the small heave stiffness, the heaving natural period usually exceeds 20 seconds, even up to 30 seconds, coupled with the effect of viscous damping, its heave motion response is small, usually the maximum possible heave amplitude can be controlled within 3 meters in 100-year period environmental conditions, so dry well can be installed on the platform. The disadvantages of the SPAR platform are: due to the small heave stiffness, small change of the platform operating weight will lead to larger changes in the draft, difficult to store liquid; the platform cylinder and the topside facilities must be built, transported and offshore installed discretely, and then connected and commissioned at sea, requiring specialized transport vessels and large offshore floating crane, with complex installation procedures, high difficulty and risk, high project cost and long construction and offshore installation period; in addition, the SPAR platform's roll and tilt of is larger in the production operations state, especially in the harsh sea conditions.

The cylindrical floating platform is characterized by: the draught is not deep, usually 20 to 30 meter or so; the waterline area is large, the diameter of the cylinder usually more than 50 meters and the largest maybe more than 100 meters, the displacement is relatively large; the center of buoyancy is lower than the center of gravity, the platform's stability is provided by the moment of inertia of the waterline area; mainly relies on the anti-motion structure (damping structure) which surrounds the out wall bottom heel of the cylinder to improve the hydrodynamic performance, especially the heave motions performance. The advantages of the cylindrical floating platform are: similar to the ship-shaped FPSO, the whole platform, including the cylinder hull and the topside facilities, can be constructed, installed, tested and pre-commissioned in one piece and one time at the shipyard, and then dry or wet towed to the oil/gas field, greatly saving the project investment and time schedule; ideal for liquid storage. The heave motion of the cylindrical floating FPSO is comparable and the roll performance is better compared with the ship-shaped FPSO, and the heave performance may be near to the SPAR if the cylindrical platform is optimized specially with a very large diameter damping structure (the anti-motion structure). The disadvantages of the cylindrical floating platform are: due to the high heave stiffness, usually the heave natural period of the current cylindrical floating platform is about 16 seconds, the heave performance of mostly cylindrical floating platforms are not good in the harsh sea conditions. In order to increase the heave natural period and optimize the motion performance, improvements and optimizations, such as increasing the outer dimension of the anti-motion structure and the platform draft, and lowing the top of the anti-motion structure below water depth of 30 meters if possible, are usually needed. However, the effects of the said improvements and optimizations are very limited, especially to some cylindrical floating platforms with special features and/or purposes, such as cylindrical floating platforms with small liquid storage (like small-sized cylindrical FPSO) or, with small operating weight (20,000 to 30,000 tons or less) and without liquid storage, like wellhead platform, the oil and gas production platform, power generation platform, aquaculture platform, whose displacement is small and draft is not deep. As result, the hydrodynamic performance of the said platforms will be poor in the harsh sea conditions, it is extremely difficult to adopt the above measures to improve the motion performance, and the desired effect cannot be achieved at all.

In view of the above deficiencies, the inventor of the present application, after long research and practiced, proposed a new-type of column floater whose operating draft is between that of spar and the current cylindrical floating platform, and an anti-motion structure is set around the cylinder outer wall bottom heel of the column floater. Accordingly, the new type of column floater has the main advantages of said two current platforms, and avoids the disadvantages.

Contents of the Invention

In order to design a new-type of floating platform with the advantages of the SPAR platform and the current cylindrical floating platform, this invention discovers a column floater with extended cylinder (CFEC for short hereafter) and a ring buoy-group. The CFEC, with excellent hydrodynamic performance, can be constructed, installed, tested and pre-commissioned in one piece and one time at the shipyard, and then dry or wet towed to the oil/gas field, greatly saving the project investment and time schedule. The CFEC can be used for the offshore oil and gas exploration, development and production, offshore gas electricity generation or nuclear electricity generation, liquid storage and supply, deep-water aquaculture, tourism and sightseeing, and so on.

The CFEC of this invention includes the following four parts:

An Upright Buoy: The upright buoy, with two ends of top plate and bottom plate, floats on the water surface, the top plate is above the water surface and a moonpool is or not set in the center of the upright buoy through the top to the bottom.

An Extended Cylinder: The extended cylinder includes at least one layer of cylinder connected to the bottom plate of the upright buoy and is extending downwards with an opening at the bottom. Of these, the multi-layer extended cylinders have a common vertical center axis and the outer diameter of the outermost layer of the extended cylinder is equal to or larger than the outer diameter of the outermost wall of the upright buoy; an anti-motion structure is installed around the bottom heel of the outer wall of the outermost extended cylinder. The extended cylinder has two types of fixed and sliding, which form a column floater with fixed extended cylinder (CFFEC for short hereafter) and a column floater with sliding extended cylinder (CFSEC for short hereafter) respectively.

A Positioning System of the Column Floater: The positioning system is one or two combinations of mooring system and DP system.

Topsides: The topsides are located on the top and/or in the interior of the upright buoy.

This invention also discovers a ring buoy-group specially used for the CFFEC, which can provide the necessary stability for the offshore installation and relocation of the CFFEC. The ring buoy-group comprises a plurality of construction buoys and each buoy possesses same configurations for offshore construction purpose. The two adjacent construction buoys are detachably connected to each other by at least one chain/cable. Each of the construction buoys is preinstalled or site-installed, evenly distributed, snugly around the outer wall of the straight cylinder of the CFFEC to form a "swim ring", which can slide up and down along the straight cylinder without any obstacles. The ring buoy-group will float on the water surface and the stability for the installation and construction of the CFFEC is provided by the buoy-group's moment of inertia of water plane.

During dry dock construction, launching and wet towing of the CFFEC, the whole or part of the central entrained water/gas-float compartment or the bottom entrained water/gas-float compartment of the floater will be filled with air and become a buoyancy compartment to provide the buoyancy required by the CFFEC. During dry dock construction, launching and wet towing of the CFSEC, the tops of all sleeves of sliding cylinder are temporarily fixed to the upper part of the upright buoy, and the upright buoy will provided the buoyancy required by the CFSEC. Whether the CFFEC or the CFSEC, if the upright buoy has a small outside diameter (water plane area is small), the anti-motion structure may be used to temporarily provide additional buoyancy to ensure that the entire platform can also float in the dry dock or at the dockside (water depth of 12 meters or less). Meanwhile, the anti-motion structure can also provide the stability for the wet towing of the CFFEC or the CFSEC. So the CFEC of this invention can be constructed, installed, tested and pre-commissioned in one piece and one time at the shipyard, and then dry or wet towed to the oil/gas field greatly saving project investment and time schedule. The ring buoy-group of this invention can provide stability for the installation and construction of the CFFEC.

BRIEF DESCRIPTION OF THE DRAWINGS

The figures described herein are for the purposes of interpretation only and are not intended in any way to limit the scope of the present invention to be disclosed. In addition, the shape, the proportional dimensions of each part of the drawings are illustrative only, to help understanding of the present invention, and are not intended to limit the shape and the size of the respective components of the present invention. The technical personnel in the field under the guidance of the present invention, according to specific circumstances, may choose a variety of possible shapes and proportional size to implement the present invention.

FIG. 7-1 is a structure sketch of the anti-motion structure with a square-box typed radial crossing section;

FIG. 7-2 is a structure sketch of the anti-motion structure with a pentagon-box typed radial crossing section;

FIG. 7-3 is a structure sketch of the anti-motion structure with a trapezia-box typed radial crossing section;

FIG. 7-4 is a structure sketch of the anti-motion structure derived from FIG. 7-1, whose box-shaped structure bottom is cancelled to form a downward opening;

FIG. 7-5 is a structure sketch of the anti-motion structure derived from FIG. 7-2, whose box-shaped structure bottom is cancelled to form a downward opening;

FIG. 7-6 is a structure sketch of the anti-motion structure derived from FIG. 7-3, whose box-shaped structure bottom is cancelled to form a downward opening;

FIG. 7-7 is a structure sketch of the anti-motion structure derived from FIG. 7-1, whose box-shaped structure top is cancelled to form an upward opening;

FIG. 7-8 is a structure sketch of the anti-motion structure with a U-shaped radial crossing section (top opened with an annular gap between the anti-motion structure and the cylinder);

FIG. 7-9 is a structure sketch of the anti-motion structure derived from FIG. 7-8 with a radial gap of a large top and a small bottom;

FIG. 7-10 is a structure sketch of the anti-motion structure derived from FIG. 7-8 with a radial gap of a small top and a large bottom;

FIG. 7-11 is a structure sketch of the anti-motion structure with an inverted U-shaped radial crossing section (opening downward, with a radial gap between the anti-motion structure and the cylinder);

FIG. 7-12 is a structure sketch of the anti-motion structure derived from FIG. 7-11 with a radial gap of a small top and a large bottom;

FIG. 7-13 is a structure sketch of the anti-motion structure derived from FIG. 7-11 with a radial gap of a small top and a large bottom;

FIG. 8 is a structure schematic of the CFFEC with bottom entrained water/gas-Float compartment (CFFEC-B for short) of the preferred embodiment of this invention—CFFEC-B for aquaculture—floating cage;

FIG. 9 is a structure schematic of the CFFEC-B of another preferred embodiment of this invention—CFFEC-B for non-aquaculture.

DETAILED DESCRIPTION

Figure 1:
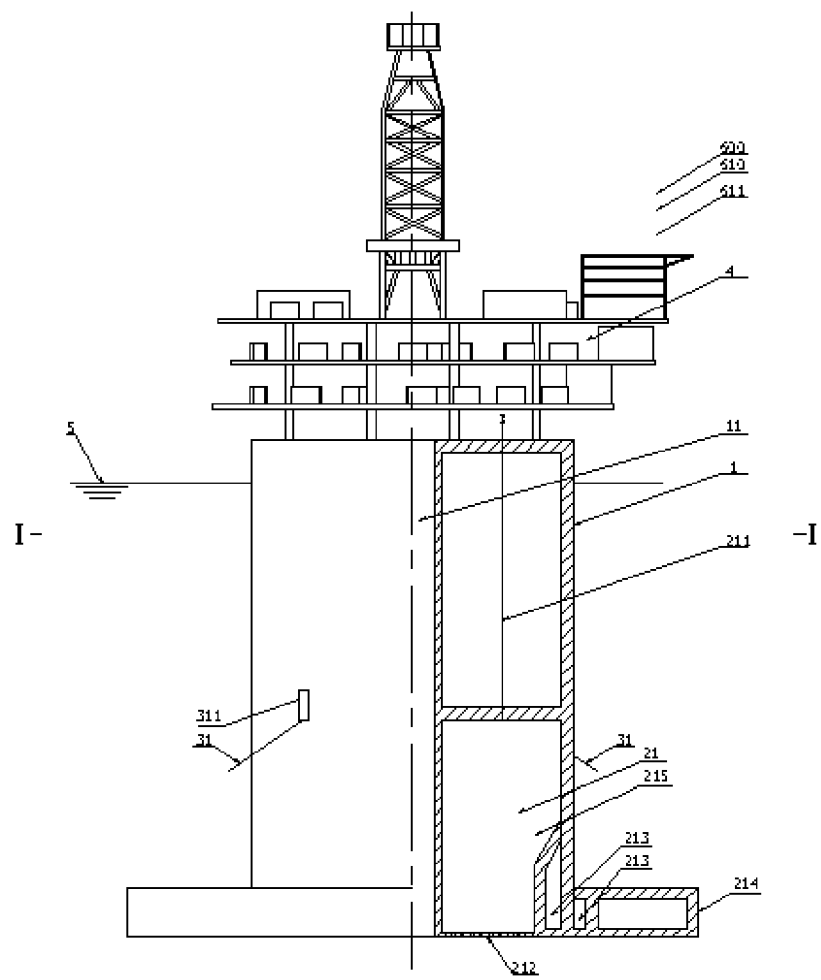
FIG. 1 is a structure schematic of the CFEC of the preferred embodiment of this invention—the CFFEC with Central Entrained Water/Gas-Float Compartment.

The details of the invention can be understood more clearly in combination with the figures and the description of the embodiments of the present invention. However, the specific embodiment of the present invention described herein, only for the purpose of interpreting the present invention, cannot be construed in any way as a limitation of the present invention. Under the guidance of the present invention, the technician may conceive any possible deformation based on the present invention, which shall be regarded as belonging to the scope of the present invention.

The column floater with extended cylinder (CFEC) 600 comprises two forms of a column floater with fixed extended cylinder (CFFEC) 610 and a column floater with sliding extended cylinder (CFSEC) 620; and the first one also includes two sub-forms of the CFFEC with central entrained water/gas-float compartment (CFFEC-C for short hereafter) 611 and the CFFEC with bottom entrained water/gas-float compartment (CFFEC-B for short hereafter) 612.

See FIGS. 1, 3, 8 and 9, the CFEC 600 consists of the following four parts:

An upright buoy: The upright buoy, with two ends of a top plate and a bottom plate, floats on the water surface 5 and the top plate is above the water; a moonpool 11 is or is not set in the center of the buoy through the top to the bottom. The moonpool is an upright cylinder, or a cone with large bottom, or an upright cylinder in the up and a cone with large bottom open in the lower, or the central space of the buoy which consists of multiple cylinders without a central cylinder.

The interior of the upright buoy 1 can be used as a multi-purpose compartment and cabin, such as one or several kinds of ballast seawater compartment, liquid storage compartment, empty or buoyancy compartment, engine room, pump room, nuclear reactors, residential cabin, and so on. Depending on the application, different sizes of the moonpool 11 are required, for example, when used for deep water aquaculture, the diameter of the moonpool is quite large.

Extended cylinder(s) 2: The extended cylinder includes at least one layer of cylinder connected with the bottom plate of the upright buoy 1 and extending downwards with an opening at the bottom. Of these, the multi-layer extended cylinders have a common vertical center axis and the outer diameter of the outermost extended cylinder is equal to or larger than the outer diameter of the outermost wall of the upright buoy 1; the outer wall of the outermost extended cylinder is surrounded by an anti-motion structure 214 or 225. The extended cylinder 2 has two types of a fixed one 21 and a sliding one 22, which form a column floater with fixed extended cylinder 610 (CFFEC) and a column floater with sliding extended cylinder 620 (CFSEC) respectively.

A Positioning system of column floater 3: The positioning system is one or two combinations of mooring system 31 and DP system.

Topsides 4: The topsides are located on the top and/or in the interior of the upright buoy 1. Depending on the application, different and several types of topsides 4 are required.

It should be noted that the upright buoy and cylinders, as described in the present invention, are upright, including cylinders with circular or regular polygon cross-sections; and to simplify the text, no special writing "attribute of circular or regular polygon" in the text hereafter; in other words, the cross-sections of cylinders may be regular polygon or circular; of which, the outside diameter means the outside diameter of the circular cross-section, or the circumscrible diameter of the regular polygon cross-section, and the inside diameter means the inside diameter of the circular cross-section, or the inscrible diameter of the regular polygon cross-section. If the upright buoys are made up of multiple cylinders (i.e., multi-cylinder-typed upright buoy), the cross-sections of the buoy cylinders are composed by multiple circles, and the outside and inside diameter of the buoy cylinder means the circumcircles and the incircles respectively. The structure of the buoy and the cylinder, as well as the structure of the anti-motion structure of the present invention, are usually designed and constructed in the form of steel plates with inside reinforcement structures. The reinforced structures are horizontal strong frames (circular or regular polygon) and/or vertical longitudinal girders and stiffeners. Of these, the inside diameter means the inside diameter of the largest-sized horizontal strong frames. The thicknesses in the attached figures are the thickness of the steel plate added the reinforced structure. The steel structure can be partially or totally replaced by non-metallic materials such as FRP. Furthermore, some steel or FRP cylinders with holes can be replaced by steel mesh or FRP barrel skeleton connected with fixed mesh fabric.

As an embodiment of the upright buoy 1, the upright buoy 1 comprises at least one layer of upright cylinder with the same perpendicular central axis and at least two layers of horizontal plate with watertight connections to the cylinder; said two layers of horizontal plate include the top plate and the bottom plate. The outer layer wall of the upright buoy is a cylinder, or the lower part of the outer layer wall is a cylinder (in water and protruding out of the water surface 5), and the upper part is a conical cylinder with its upper opening area larger than its lower opening area. Preferably, the interior of the upright buoy 1 may be symmetrically provided with a plurality of radial vertical dividing structures which are in water-tight connection with the cylinder and the horizontal plate as required to form a plurality of compartments. The upright buoy 1 floats on the water surface 5, and the top of the buoy 1 rises above the water, and the moon pool 11 penetrating upwards and downwards is or is not arranged in the center of the upright buoy. The moon pool 11 can be an upright cylinder or a cone cylinder with the upper opening area less than the lower opening area, or the upper part of the moon pool 11 is a cylinder and the lower part of the moon pool 11 is a cone cylinder with the upper opening area less than the lower opening area.

As another embodiment of the upright buoy 1 of the present invention, the upright buoy 1 comprises an outer cylinder and at least one inner upright cylinder with a common vertical central axis, as well as at least two layers of horizontal plate with watertight connections to the cylinders; said two layers of horizontal plate include the top plate and the bottom plate. The outer cylinder is divided into four sections from the bottom to the top, i.e., an underwater cylinder, a water surface conical cylinder with the upper opening area less than the lower opening area, an above-water cylinder, and a top cone cylinder with the upper opening area larger than the lower opening area. During the production and in-place conditions of the column floater, the water surface 5 is always located at the water surface conical cylinder for the winter ice-resistance, regardless of the high or low water level.

As still another embodiment of the upright buoy 1 of the present invention, the upright buoy 1 comprises at least three cylinders which are connected closely or with spacing to each other by the top plate and the bottom plate at both ends, forming an integral structure, namely multi-cylinder buoy. For the need to set the moonpool of the multi-cylinder buoy, wherein the center of the multi-cylinder buoy dose not set a cylinder, resulting in a central space up and down through the buoy 1 to form the moonpool 11. The top plate and the bottom plate are important structural members that connect the multiple cylinders to make them a solid whole. The bottom plate is circular or circular ring. The diameter of the circle or the outside diameter of the circular ring is equal to or greater than the diameter of the circumscribed circle of the multi-cylinder. The inside diameter of the circular ring is equal to the inscribed circle of the multi-cylinder, and the ring hole is the bottom outlet of the moonpool 11 of the upright buoy 1. A further object of the bottom plate being a circular or annular structure is to facilitate to fix the watertight connection of the fixed extended cylinder 21, or to connect the sliding extended cylinder 22 below the bottom plate. The structure of the top plate can be any form provided that it is easy to connect/install the topside facilities 4. Preferably, the diameter of the circle or the outside diameter of the circular ring is equal to or slightly larger than the diameter of the circumscribed circle of the multi-cylinder.

For the CFEC 600 which has small water plane area and deep draft, it needs an anti-motion structure 214 or 225 as the buoy to provide not only the buoyant force, but also the required stability in conditions of in-dock construction, wet tow and offshore installation. Therefore, the inertia moment of the waterline area of the anti-motion structure 214 or 225 shall, individually, or at least in conjunction with the central entrained water/gas-float compartment 215, or the bottom entrained water/gas-float compartment 216, be able to provide the stability required for the conditions of in-dock, wet tow and offshore installation.

The present invention has two types of embodiments of the CFFEC 610. The first type is the CFFEC with a central entrained water/gas-float compartment 611 (CFFEC-C 611 for short hereafter. See FIG. 1), and the second type is the CFFEC with bottom entrained water/gas-float compartment 612 (CFFEC-B 612 for short hereafter, see FIG. 8 and FIG. 9).

As several feasible embodiments, the bottom of the two kinds of entrained water/gas-float compartment (central entrained water/gas-float compartment 215 and bottom entrained water/gas-float compartment 216) in this invention are opening; and an inflation/exhaust pipe 211 is installed upwards on the top of said two kinds of compartment (215 and 216) and plugs into the interior of or further penetrates the top of the upright buoy. A valve is set in the upper part of the inflation/exhaust pipe 211. A horizontal bottom damping plate 212, with one or several damping holes on the plate 212 is either or not set at the bottom opening of said two kinds of compartment. The bottom damping plate 212 can increase entrained water, heave damping and improve motion performance. If required, a purpose-designed bottom hatch cover, which can be opened or closed, set on the damping hole of the bottom damping plate 212. When the bottom hatch cover is closed, the gas-float compartment will change to be an airtight buoyant compartment which is good for safety of the long distance wet towing. A bottom solid ballast compartment 213 may be either or not set at the bottom of said two kinds of compartments, and the bottom solid ballast compartment 213 shall not block the damping hole of said two kinds of compartment. The function of the bottom solid ballast compartment 213 is to lower the center of gravity (COG) of the platform and, if necessary, the COG may even lower than the buoyancy center. A fixed extended cylinder anti-motion structure 214 is installed rounding the outer wall of said two kinds of compartment (215 and 216) at the bottom heel, as a proven technique, which is an important member to improve the motion performance of the floater and able to increase added water and heave damping greatly. At the same time, some fixed extended cylinder anti-motion structure 214 can provide additional buoyancy and stability for the floater during construction and offshore installation.

Figure 2:
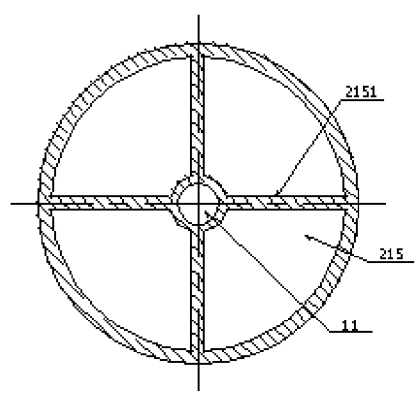
FIG. 2 is a cross-sectional schematic of FIG. 1 from I-I.

FIG. 1 shows the first type of the preferred embodiment of this invention of the CFFEC 610, i.e., CFFEC-C 611. Inside at least one layer cylinder of the fixed extended cylinder 21 of CFFEC-C 611, a plurality of central compartment vertical radial partitions 2151 are either or not symmetrically set in watertight connection with the bottom plate of upright buoy 1 and one or several layer cylinder of the fixed extended cylinder 21, so that, at least one central entrained water/gas-float compartment 215 with airtight-top and open-bottom is formed. As to the upright buoy 1 with the central moonpool, the innermost layer cylinder of the fixed extended cylinder 21 will become a part of the moonpool 11 (see FIG. 1), which means that the fixed extended cylinder 21 of the CFFEC shall set at least two layers of the fixed cylinder. As shown in FIG. 2, the cross-sectional schematic of the CFFEC-C, the fixed extended cylinder 21 is a two-layer structure of the outermost layer cylinder and the moonpool cylinder, wherein four vertical radial partitions of central compartments 2151 are arranged between the two layers, thus forming four central entrained water/gas-float sub-compartment with an airtight top and an open bottom. The present invention has some embodiments without a moonpool, then its fixed extended cylinder 21 having only at least one outmost layer of cylinder can meet the minimum requirement.

The second type of the preferred embodiment of this invention of the CFFEC 610 is the CFFEC-B 612, which includes two categories of embodiment. The first category is CFFEC-B for Aquaculture-Floating Cage 6121 and the second category is CFFEC-B for Non-Aquaculture 6122, see FIGS. 8 and 9.

A bottom compartment horizontal partition 2161, or a bottom compartment conic partition with downward opening 2162 is arranged with the water-tight connection to the inner lower part of at least one layer cylinder of the fixed extended cylinder 21 of the CFFEC-B 612. Thus, the fixed extended cylinder is divided into the upper and the lower of two parts: The upper part is the hole cylinder 2163 with distributed damping holes and/or low square holes 2164 on the wall of the cylinder to make the internal and external waters connected to each other. The lower part is the bottom entrained water/gas-float compartment 216 which is formed by at least one layer cylinder of the bottom compartment cylinder 2165 with water-tight connection to the bottom compartment horizontal partition 2161 or the bottom compartment conic partition with downward opening 2162. The innermost cylinder of the bottom entrained water/gas-float compartment 216 is a bottom moonpool 2166 up-an-down penetrating the compartment 216 if the upright buoy 1 has the moonpool 11 in the center. Inside the bottom entrained water/gas-float compartment 216, several vertical radial partitions may either be or not arranged with water-tight connection to the cylinder and the bottom compartment horizontal partition 2161 or the bottom compartment conic partition with downward opening 2162, thus forming at least one entrained water/gas-float sub-compartment with an airtight top and an open bottom. All said entrained water/gas-float sub-compartments together constitute the bottom entrained water/gas-float compartment 216.

Figures 1, 7:
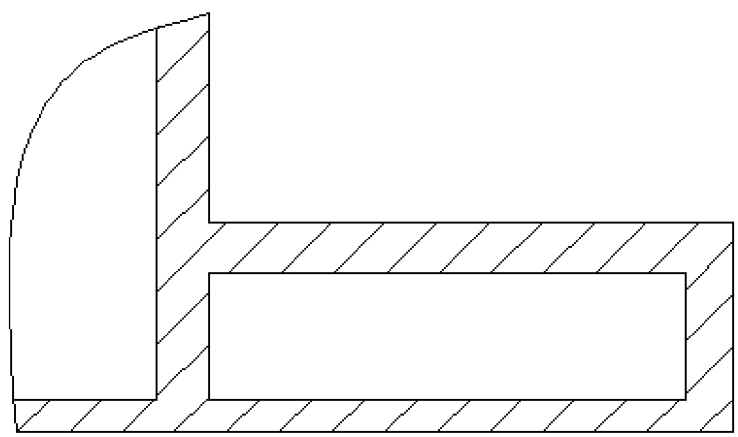
Figures 2, 7:
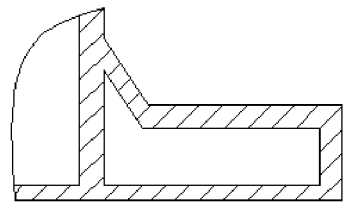
Figures 3, 7:
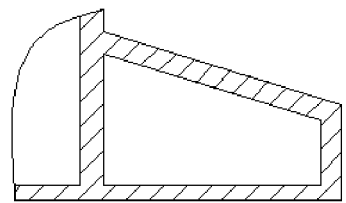
Figures 4, 7:
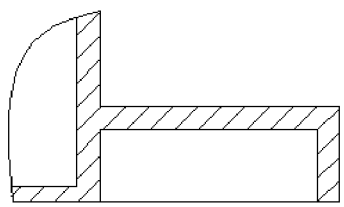
Figures 5, 7:
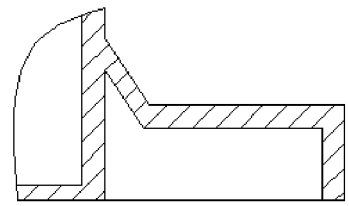
Figures 6, 7:
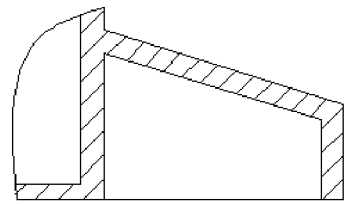
Figure 7:
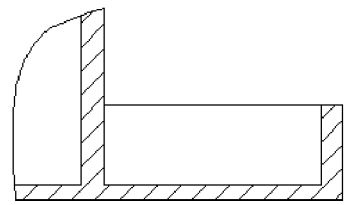
Figures 7, 8:
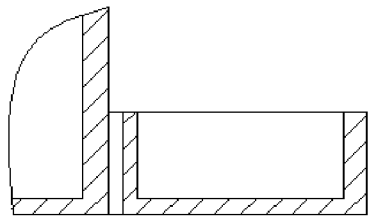

The first category of embodiments of the CFFEC-B 610 of this invention is the CFFEC-B for aquaculture—floating cage 6121 (see FIG. 8). The upright buoy 1 of the cage 6121 contains only two layers of cylinder with the same central vertical axis—the outer cylinder and the inner large diameter moonpool cylinder, and between the two layers of cylinder is a sea water ballast compartment/the buoyancy empty compartment. The topsides 4 are located in the buoyancy empty tank and/or at the top of the upright buoy 1. The topsides 4 include some equipment for aquaculture such as pump, air compressor and other electromechanical equipment and system. The moonpool cylinder will become the moonpool 11 with quite large diameter, usually up to tens of meters or more. An openable grid 111 is installed at the top opening of the moonpoo 11, the grid 111 is closed and locked during the non-fishing operation, and the grid 111 is opened and fixed in the appropriate position during the fishing operation to facilitate the work.

A plurality of horizontal connection pipes are uniformly are either set or not in the underwater part of the upright buoy 1 of the floating cage 6121, and if set, the interior of the moonpool 11 is connected to the external seawater in the horizontal direction. The hole cylinder 2163 is only one layer of cylinder and its bottom is symmetrically provided with a plurality of lower square holes 2164 whose bottom edge is connected to the conic partition 2162, and the rest upper part of the hole cylinder 2163 above the lower square holes 2164 is symmetrically provided with a plurality of damping holes. The bottom entrained water/gas-float compartment 216 is composed of a bottom compartment cylinder 2165 and a conic partition 2162 at its top, wherein the bottom compartment cylinder 2165 consists of at least two layers of cylinder including the outermost cylinder and the cylinder of the bottom moonpool 2166, and the diameter of the bottom moonpool 2166 is smaller than the diameter of the moonpool 11. Besides, the bottom damping plate 212 is set at the bottom opening of the bottom entrained water/gas-float compartment 216. As a preferred embodiment, between the conic partition of bottom compartment 2162 and the bottom damping plate 212, a plurality of bottom-up pipes are set with watertight connection of them to guarantee the top of each bottom entrained water/gas-float sub compartment watertight. A grid 2167 is provided to plug each of damping hole, bottom square hole, the top opening of the bottom moonpool 2166 and the top opening of each bottom-up pipe, which is designed to prevent the fish escaping. The moonpoll 11, the hole cylinder 2163 and the conic partition of bottom compartment 2162 form a breeding pool. As an embodiment, an up-down movable grid 2168 can be set at the position inside the hole cylinder 2163 and near the bottom moonpool 11 if required.

The functions of the horizontal connection pipe, the hole cylinder 2163, the lower square holes 2164 and the bottom-up pipe is to connect to the breeding pool to the external seawater to benefit to increase the oxygen content and to remove the fish feces, the bait residue and the harmful substances. The conic partition of bottom compartment 2162 located at the bottom of the breeding pools is used to undertake fish feces, bait residue and harmful substances. The conical surface facilitates the downward slide of said harmful substances out of the pool. In addition, with the installation of pressure seawater nozzle on the hole cylinder 2163 and/or with the pressure seawater spray by hand through the bottom square hole 2164 can periodically, automatically and/or manually remove said harmful substances on the cone surface. The up-down movable bottom grid 2168 is lifting and positioning by at least two sets of winch/wire ropes. When the up-down movable bottom grid 2168 is at the bottom (the top of the conic partition 2162), it is the normal production state for aquaculture. When the up-down movable bottom grid 2168 is located at the top of the hole cylinder 2163 (the bottom of the upright buoy), it is the fishing state, easy to catch.

During the normal production state of the floating cage 6121 of this invention, the upright buoy 1 is floating on the water surface. If necessary, especially in the case of severe sea conditions, pump seawater into the seawater ballast compartments of the upright buoy 1 to make it sink but still have a certain freeboard (do not make the whole upright buoy 1 below the surface); then start the winch of the mooring system 31 to heave all the mooring chain/cable of the mooring legs, until the vertical buoy 1 is completely submerged and floated in the set water depth, finally fix and lock the leg chain stopper. When the upright buoy 1 needs to float again on the water, loosed the mooring legs, discharge the ballast seawater, the upright buoy 1 rises until it reaches the set freeboard; and then, lock the chain legs again to complete the required assignment.

Figures 7, 8, 9:
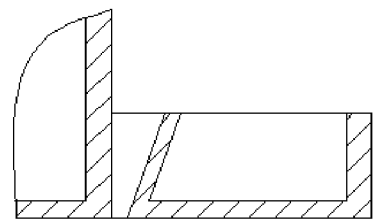
Figures 7, 8, 9, 10:
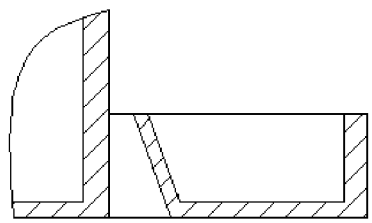
Figures 7, 8, 9, 10, 11:
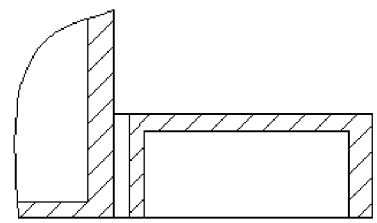
Figures 7, 8, 9, 10, 11, 12:
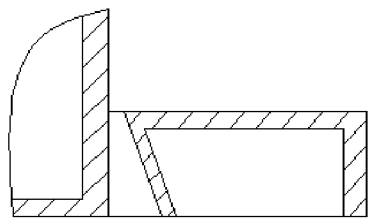
Figures 7, 8, 9, 10, 11, 12, 13:
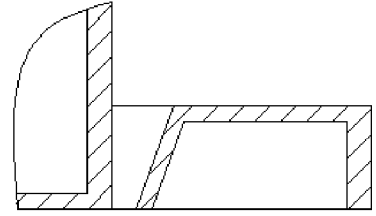
Figure 8:
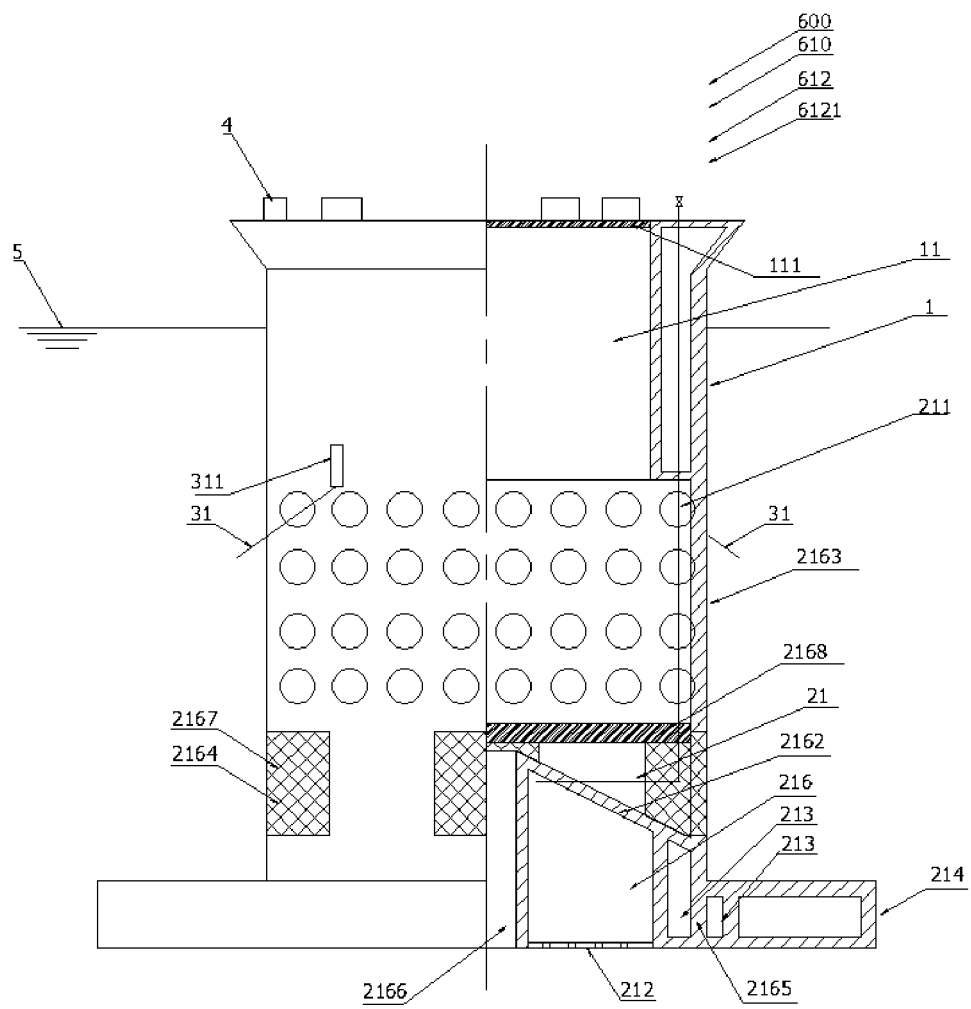
Figure 9:
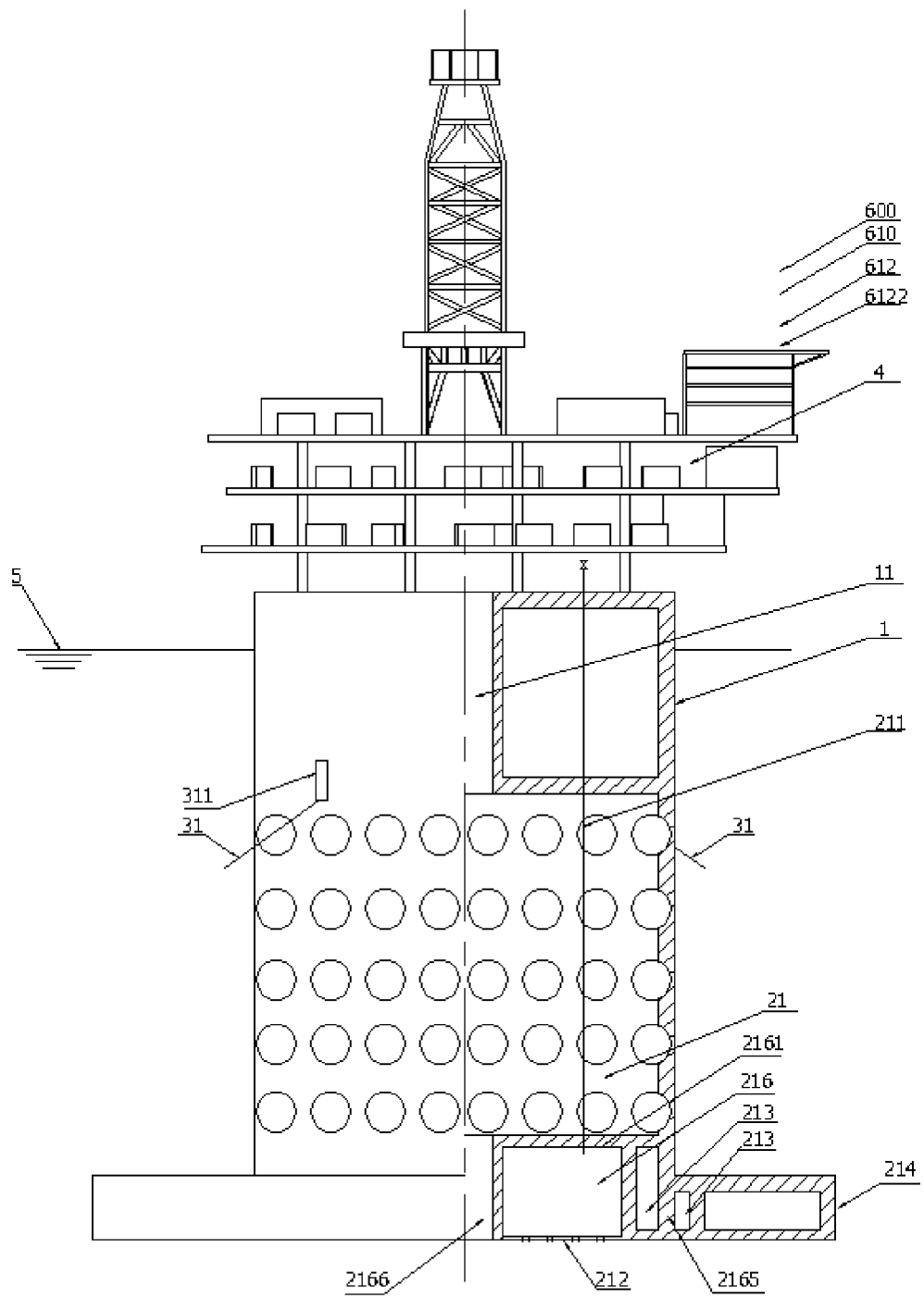

The second category of embodiments of the CFFEC-B 610 of this invention is CFFEC-B for non-aquaculture 6122, see FIG. 9, which has multiple non-aquaculture purposes, such as offshore oil/gas development. The horizontal partition 2161 is set with water-tight connection of to the lower portion inside the fixed extended cylinder 21 of the CFFEC-B for non-aquaculture 6122 to form a bottom entrained water/gas-float compartment 216. The entire wall of the hole-cylinder 21631 of the CFFEC-B for non-aquaculture 6122 is set with uniformly distributed damping holes. So, compared with CFFEC-C 611, the CFFEC-B for non-aquaculture 6122 has bigger damping and better water hydrodynamic performance.

When the CFFEC 610 is in-dock construction, being launched or wet towed, the top valve on the inflation/exhaust pipe 211 is closed, and all or partial inner space of the central entrained water/gas-float compartment 215 or the bottom entrained water/gas-float compartment 216 is filled with air to form a floating tank in the water and provide the required buoyancy for the CFFEC 610. When the CFFEC 610 is already towed to the offshore destination and starting offshore installation, the top value on the inflation/exhaust pipe 211 is opened to discharge the air by the seawater pressure, and the CFFEC 610 is gradually sinking and the central entrained water/gas-float compartment 215 or the bottom entrained water/gas-float compartment 216 is filled with sea water until the upright buoy 1 provides the buoyancy for the CFFEC 610 to complete the installation. During in-place condition (offshore production or survival conditions) of the CFFEC 610, the central entrained water/gas-float compartment 215 or the bottom entrained water/gas-float compartment 216 is still full of water, and the buoyancy required by the CFFEC 610 is provided by upright buoy 1 all time. If the CFFEC 610 needs relocation to make the central entrained water/gas-float compartment 215 or the bottom entrained water/gas-float compartment 216 to provide buoyancy again, fill air through the inflation/exhaust pipe 211 to discharge the sea water from said entrained water/gas-float compartment.

Figure 3:
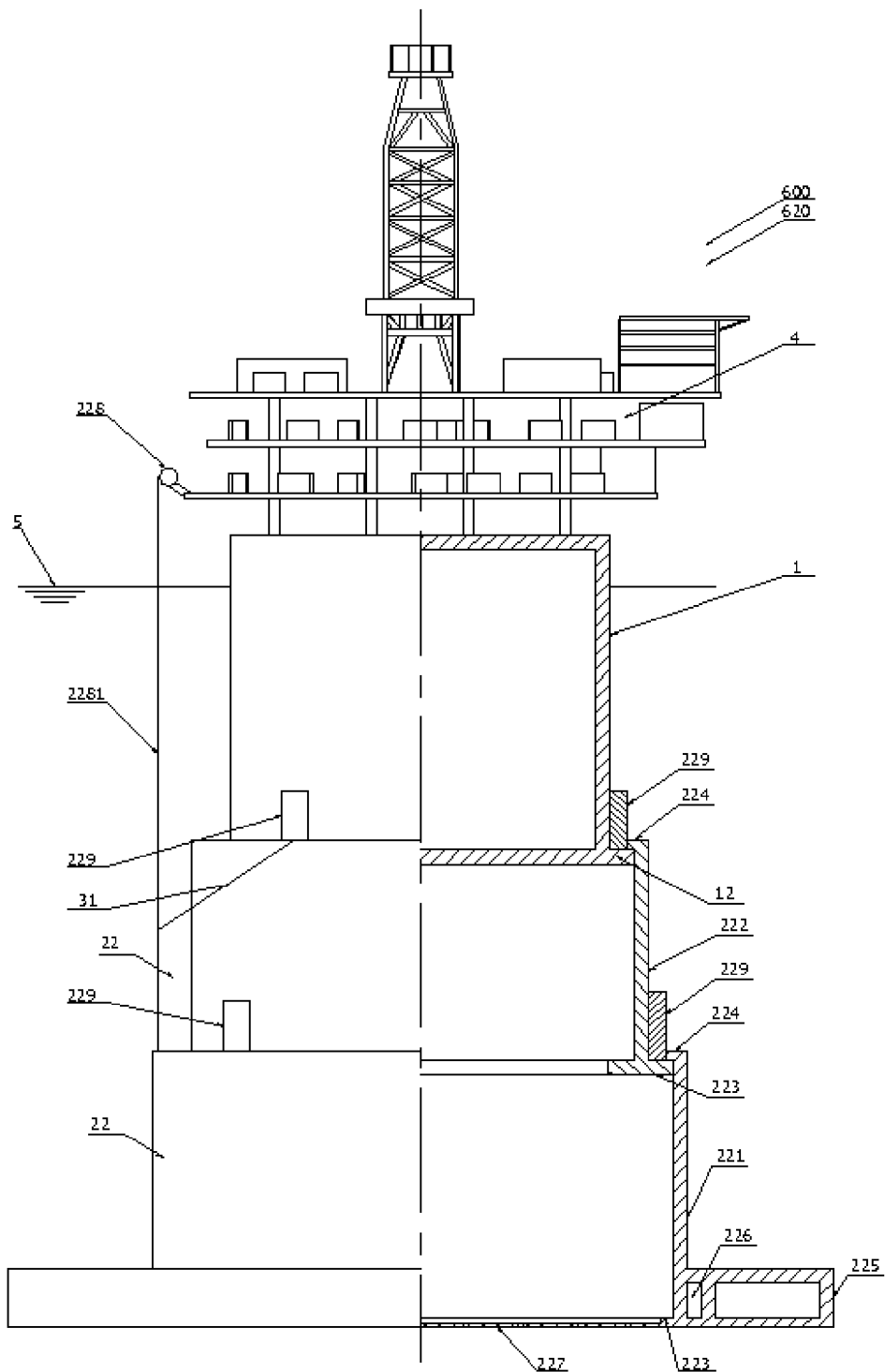
FIG. 3 is a structure schematic of the CFEC of another preferred embodiment of this invention—CFSEC.

The embodiment of this invention showed in FIG. 3 is the CFSEC 620 (in-place condition), of which, the sliding extended cylinder 22 is at least one layer of cylinder sleeved on the outer wall of the upright buoy 1. The sliding extended cylinder 22 and the upright buoy 1 have the same perpendicular axis through the center. As an embodiment, the CFSEC 620 shown in FIG. 3 has a two-layer of cylinder, that is, the outmost sliding extended cylinder 221 and the sliding extended cylinder adjacent to upright buoy (called upright buoy sliding extended cylinder 222). As another embodiment, the CFSEC 620 shown in FIG. 3 can only have one layer of cylinder, that is, the outmost sliding extended cylinder 221 and the upright buoy's sliding extended cylinder 222 become as one. As a special embodiment, the upright buoy 1 of CFSEC 620 shown in FIG. 3 is replaced by the upright buoy 1 with the fixed extended cylinder 21 shown in FIG. 1 (the outer diameter of the two of the upright buoy is same, without the anti-motion structure 214), and the sliding extended cylinder 22 is set on the outer wall of the fixed extended cylinder 21. The layer cylinder of each sliding extended cylinder is either set or not multiple damping holes. The distribution of the damping holes of the cylinder can help to reduce the vortex-induced motion (VIM) of the floater induced by the sea flow.

Figure 4:
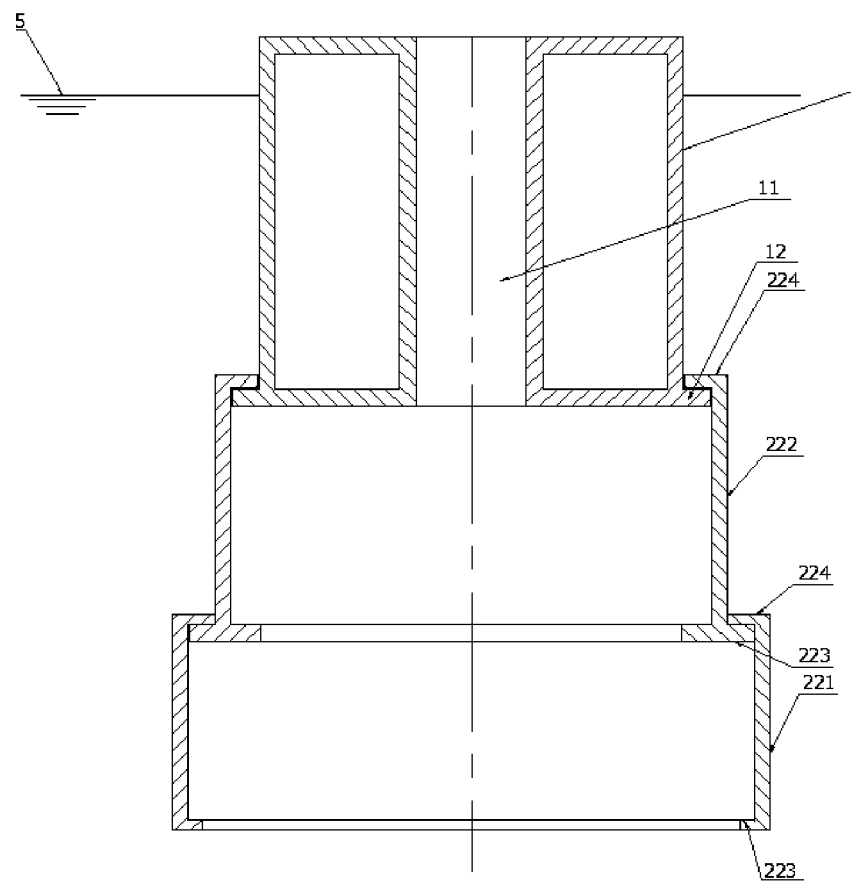
FIG. 4 is an in-place structure schematic of the CFSEC of this invention (without topsides)

In order to solve the need of the sliding extended cylinder upper and lower limit and positioning, as an implementation, an upright buoy bottom flange ring 12 is connected to the outer wall of the bottom of the upright buoy 1 or the outer wall of the fixed extended cylinder 21, of which, the latter, as a special preferred embodiment, is a special upright buoy with fixed extended cylinder. A cylinder bottom flange ring 223 and a cylinder top flange ring 224 are respectively connected to the outer wall of the bottom and the inner wall of the top of each layer cylinder of the sliding extended cylinder 22. The inner diameter of each layer extended cylinder is equal to the outer diameter of its upper adjacent upright buoy bottom flange ring 12, or, is equal to the outer diameter of its upper adjacent cylinder bottom flange ring 223, to guarantee that each sliding extended cylinder can slide up and down. The inner diameter of the cylinder top flange ring 224 is equal to or slightly larger than the outer diameter of its upper adjacent upright buoy 1 or the sliding extended cylinder. The inner diameter of the cylinder bottom flange ring 223 is smaller than the out diameter of its upper adjacent upright buoy 1 or the sliding extended cylinder. The outer diameter of the cylinder bottom flange ring 223 of the outmost sliding extended cylinder 221 is equal to the outer diameter of its own cylinder (221), and the out diameter of the cylinder bottom flange ring 223 of the other layers is slightly larger than the out diameter of sliding extended cylinder 22 of its own layer cylinder. FIG. 4 is an in-place structure schematic of the CFSEC 620 (without topsides), which succinctly indicates the relationships of the position and the connection among the upright buoy 1, the outmost sliding extended cylinder 221, and the upright buoy's sliding extended cylinder 222.

Figure 5:
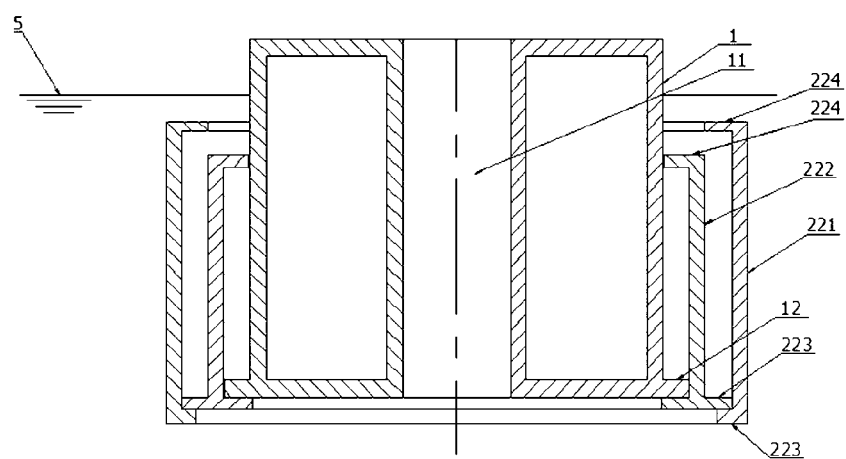
FIG. 5 is a structure schematic of the CFSEC of this invention (without topsides and in conditions of in-dock or wet tow)

FIG. 5 is a structure schematic of the CFSEC of this invention (without topsides and in conditions of in-dock or wet tow). When the CFSEC 620 (without topsides 4 in the figure) is in-dock construction, being launched or wet towed, the top inner surface of the cylinder bottom flange ring 223 of each layer sliding extended cylinder contacts the bottom surface of its upper adjacent upright buoy bottom flange ring 12, or contacts the bottom surface of its upper adjacent cylinder bottom flange ring 223. FIG. 5 succinctly indicates the relationships of the position and the connection among the upright buoy 1 and each layer cylinder during the CFSEC 620 is in-dock construction, being launched or wet towed.

When the CFSEC 620 is in-place, each layer of sliding extended cylinder is lowered down one by one until each bottom surface of the cylinder top flange ring 224 contacts the top surface of the upright buoy bottom flange ring 12, or contacts the top surface of the cylinder bottom flange ring 223 of the upper adjacent layer sliding extended cylinder, as shown in FIG. 4.

In summary, when the CFSEC 620 is in-dock construction, being launched or wet towed, all the sleeve sliding extended cylinders are lifted upwards so that the bottom of all layer are slightly below (near and below) the bottom of the upright buoy 1 and then temporarily fixed; when the CFSEC 620 arrives at the sea destination for installation, starting from the outmost sliding extended cylinder 221 to the upright buoy's sliding extended cylinder 222, to relieve the temporary fixation and rely on their own gravity to make the sliding extended cylinders drop and extend one by one; then make the upper and lower adjacent layers of sliding extended cylinder or the upright buoy 1 connect to each other end to end and fix to each other through the sliding cylinder locking mechanism 229, thus the CFSEC 620 becomes a longer, deep draft and upright floating platform during in-place conditions. When the CFSEC 620 is relocated, starting from the outermost sliding extended cylinders 221, unpin the sliding cylinder locking mechanisms 229 and lift them upwards one by one until the bottom of all layers of sliding extended cylinders are slightly below (close to and below) the bottom of the upright buoy 1 and then temporarily fix to accommodate towing.

The CFSEC 620 can be equipped with various forms of lifting system to realize the lifting of the sliding extended cylinders. As an embodiment, the lifting system shown in FIG. 3 is a winch system, which is composed of three winches 228 mounted on the topsides 4 and is 120 degrees uniform, and the top of outmost sliding extended cylinder 221 is suspended through the lifting rope 2281. Lifting the lifting rope 2281 can achieve the extended cylinders sliding on upgrading step by step, and releasing the lifting rope 2281 down, the extended cylinders can be gradually declined relying on the gravity step by step.

Figure 6:
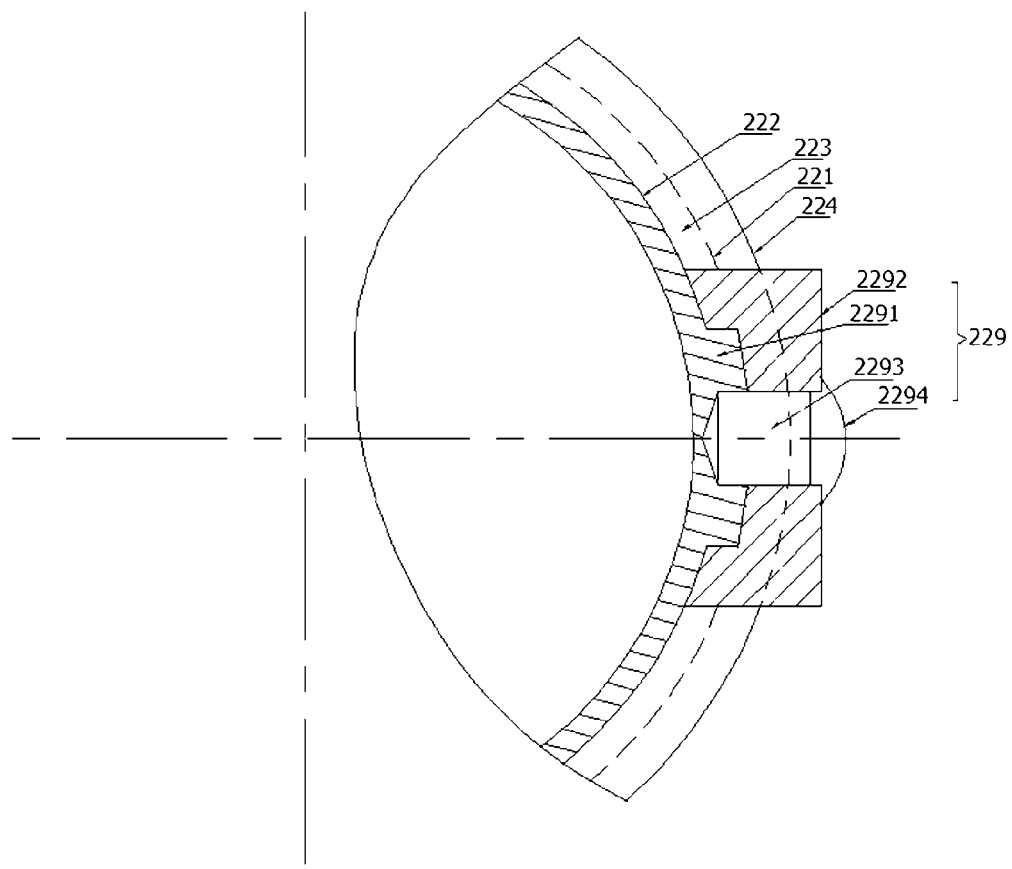
FIG. 6 is a structure schematic of the locking mechanism of the CFSEC of this invention.

The CFSEC 620 of the present invention can also be configured with various forms of locking mechanisms to ensure the sliding extended cylinders of CFSEC 620 tightly locked during in-place conditions. As an embodiment, a locking mechanism of sliding extended cylinder 229 shown in FIG. 6 is a bolt type locking mechanism to fix and lock tightly a lower sliding extended cylinder to its upper adjacent upright buoy 1 or sliding extended cylinder. The composition of the sliding cylinder locking mechanism 229 is as follows: 1. Locking boss 2291, which is mounted on said upper upright buoy 1 at its top surface of the upright buoy flange ring, or on said upper sliding extended cylinder at its outside top surface of the cylinder bottom flange ring 223 to make the boss and the flange ring as a whole. The radius of the outer arc surface of the boss 2291 is equal to the outer radius of the upright buoy flange ring 12 or the cylinder bottom flange ring 223 and the radius of the inner arc surface of the boss 2291 is equal to the radius of the outer wall of said upright buoy 1 or the outer wall of said upper sliding extended cylinder. The vertical planes on both the right and left sides are a part of a radial vertical plane passing through the center axis of the upright buoy 1. The top plane is a horizontal plane. The dimension of the locking boss 2291 is sized to meet the required space and strength for setting at least a horizontal radial pin hole (usually no more than 3 pin holes). 2. The locking seat 2292, which is installed on said lower sliding extended cylinder at the top of the cylinder top flange ring 224 to make both of them as a whole with the same bottom plane. The bottom of the locking seat 2292 is provided with a recess matching the locking boss 2291, which covers the locking boss 2291, surrounds and overlays the top surface, the outside the arc surface and the two sides. To achieve the limit and positioning of said lower sliding extended cylinder and said upper upright buoy 1 or said sliding extended cylinder, the outer surface of the locking boss 2291 circular arc, the radial vertical plane of the left and right sides and the recess surface of the locking seat 2292 are closely fitting, and there is a gap between the top horizontal flat surface of the locking boss 2291 and the recess surface of the locking seat 2292. The radius of the outer arc surface of the locking seat 2292 is larger than the radius of the outer wall of said lower extended cylinder to guarantee that the locking seat 2292 has a sufficient radial thickness to meet the requirements of strength and space for at least a horizontal radial locking pin hole (usually no more than 3 pin holes). In other words, due to the presence of the locking seat 2292, the cylinder top flange ring 224 is correspondingly provided with a notch which matches with the locking boss 2291 and becomes a part of the recess of the locking seat 2292. The locking seat 2292 and the cylinder top flange ring 224 must form a solid integral structure. 3. Locking pin 2293, which is inserted into both horizontal radial locking pin holes of the locking seat 2292 and the locking boss 2291. 4. The locking blind flange 2294 is sealed on the outer opening of the locking pin hole of the locking seat 2292. 5. Wedge is wedged between the cylinder top flange ring 224 and the wall of said upper adjacent upright buoy 1 or the wall of said upper adjacent sliding extended cylinder, which aims to eliminate the possible radial looseness between them. To this end, the inner circular wall of the cylinder top flange ring 224 has a wedge groove (wedge and wedge groove are not shown in FIG. 6).

A specific embodiment of the CFSEC 620 of the present invention is the floating platform for aquaculture with sliding extended cylinder—retractable sliding floating cage for aquaculture (Retractable Floating Cage for short hereafter). The upright buoy configuration of the retractable floating cage is basically same as that of the floating cage. The upright buoy bottom flange ring 12 is connected to the bottom outer periphery of the outer wall of upright buoy 1 of the retractable floating cage. The upright buoy of the retractable floating cage only contains two layers of cylinders with the same vertical center axis—the outer cylinder and the inner cylinder of the large-diameter moon pool 11; and the space between said two layers is seawater ballast compartment/buoyancy empty compartment. The topsides 4 are located in the buoyant empty compartment and/or on the top of the upright buoy 1. The top opening of the moon pool 11 is provided with a openable grid 111, or one or two layers of mesh fabric. A plurality of horizontal connection pipes are uniformly set or not set in the underwater part of the upright buoy 1 of the retractable floating cage, and if set, the moonpool 11 is connected to the external seawater in the horizontal direction. The sliding extended cylinder 22 of the retractable floating cage is composed of a cylinder skeleton, a layer mesh fabric fixed on the internal side of the skeleton or two layer mesh fabric fixed on both internal and external sides of the skeleton. The cylinder bottom flange ring 223 and the cylinder top flange ring 224 of the sliding extended cylinder are connected with the cylinder skeleton to form a solid integral structure. A sliding cylinder bottom solid ballast compartment 226 is set in the bottom end of the outer wall of the outmost layer cylinder of the retractable floating cage. The purpose of the sliding cylinder bottom solid ballast is keeping every layers of the cylinder tensioned in water during the normal production operation. The bottom opening of the outmost sliding extended cylinder 221 is covered with one or two layers of mesh fabric or a sliding cylinder bottom damping plate 227 which has a number of sliding cylinder bottom damping holes. The upright buoy 1 and each layer of sleeve skeleton of the sliding extended cylinder 22 of the retractable floating cage is preferably made of fiberglass or other non-metallic materials. Fairlead 311 is set in the top end of the outer cylinder wall of the upright buoy's sliding extended cylinder (sliding extended cylinder adjacent to upright buoy) 222, which is used to install mooring system 31 of the retractable floating cage. The upright buoy 1 of the retractable floating cage usually floats on the water surface during production operations, and is submerged under water in the set depth in case of unfavorable environmental conditions. In fishing operations, each cylinder of the sliding extended cylinder 22 of the retractable floating cage is lifted up one by one to the highest position and then fixed to facilitate the deployment of the fishing operations. Compared with the floating cage 6121, the retractable floating cage has the advantages of simple structure and low cost, but the disadvantage of low ability to resist the external environment.

In order to improve the hydrodynamic performance of the platform, similar to the current cylindrical FPSO, an anti-motion structure is set around the outside of the wall bottom heek of the cylindrical structure of the CFEC 600 (see FIG. 1 and FIG. 3 of 214 and 225 in the lower right corner). During the production operations or the in-place periods, the interior of the anti-motion structure is full of seawater which is connected to the external seawater and the buoyancy and stability of the CFEC 600 is provided by the upright buoy 1. Therefore, the anti-motion structure can increase the added mass and damping to improve its dynamic response without increasing the displacement of the platform. Another important function of the anti-motion structure 214 or 225 is to provide temporary buoyancy and stability required for the CFEC 600. FIGS. 7-1 to 7-13 show the total 13 kinds of existing anti-motion structures for cylindrical floating platform, wherein the majority are described by the inventor in "Straight Cylindrical Floating Platform (PCT/CN2015/ 083431)". FIG. 7-1 can be regarded as a local amplification of the fixed cylinder anti-motion structure 214 or the sliding cylinder anti-motion structure 225 shown in the lower right corner of FIG. 1 or FIG. 3, and the position relationship of each of the other 12 kinds of anti-motion structure with the fixed extended cylinder or the sliding extended cylinder are the same as shown in FIG. 1 or FIG. 3. In other words, as an embodiment, the fixed cylinder anti-motion structure 214 is set around the outside of the wall bottom heel of the fixed extended cylinder 21 of the CFFEC 610. As an embodiment, the sliding cylinder anti-motion structure 225 is set around the outside of the wall bottom heel of the outmost sliding extended cylinder of the CFSEC 620. Further, the upwards or downwards opening of the anti-motion structure 214/215 as shown in FIGS. 7-4~7-13, can be horizontally connected with a top ring damping plate or a bottom ring damping plate with at least one damping hole (not shown in figure) to further enhance the effect of anti-motion structure. It is necessary to note that the annular gap between the ring anti-motion structure shown in FIGS. 7-8~7-13 and the outer wall of the upright buoy or the outermost sliding cylinder is provided with a plurality of radial vertical elbow plate connections.

Each of these 13 kinds of anti-motion structures is used as various embodiments of the present invention. In addition, other kinds of anti-motion structures can also be adopted to meet different needs. It is well known that the water depth inside the dry dock is usually 7 meters or 10 meters, and the water depth of the dockside of the shipyard is usually 10 to 14 meters. At the same time, there is a limit to the water depth of the towing channel. In order to ensure that the CFEC of the present invention can be constructed as one-piece at the shipyard then wet towed entirely, it is necessary to ensure that the upright buoy 1 provides sufficient buoyancy to balance the weight of the entire CFEC under the above-defined water depth conditions. For those CFECs with a smaller outer diameter (smaller water plane area) of the upright buoy 1, for example, a wellhead platform or a production platform without oil storage function, the buoyancy provided by the upright buoy under the above mentioned water depth conditions is obviously far from enough. For this reason, some embodiments of the present invention utilize any of the anti-motion structures shown in FIGS. 7-1 to 7-6 and 7-11 to 7-13 to provide additional temporary buoyancy and ensure that the entire platform can also float up at the dry dock or at the dockside, wherein the box-shaped anti-motion structure is a temporary floating empty cabin, and the anti-motion structures with bottom opening, the top and the both sides closed, are temporary air floating cabins.

In order to ensure the safety and operability of the wet tow operation of the CFEC 600 with the floating cabin of the anti-motion structure 214 or 225, the interior of the anti-motion structures 214 or 225 can be divided into multiple sub-cabins, whose vertical radial crossing section is shaped as the watertight square-box with a circular horizontal bottom plate as shown in FIGS. 7-1 to 7-3, or with a circular horizontal bottom plate added to FIGS. 7-11 to 7-13. A plurality of radial vertical partitions are arranged inside the anti-motion structure 214 or 225, and said radial vertical partitions, the top plate, the inner/outer circular vertical structures and the circular (ring) horizontal bottom plate of the anti-motion structure are connected to each other to form a plurality of symmetrical and uniform water-tight sub-cabins. For the CFECs 600 which need the buoyancy and stability provided by the all or partial sub-cabins of the anti-motion structure 214 or 225, each said sub-cabin providing buoyancy and stability is an anti-motion floating cabin. An anti-motion inflation/exhaust pipe with a top valve is set at the top plate of each anti-motion floating sub-cabin. The center of the horizontal bottom plate of each said anti-motion floating sub-cabin shall be provided with a damping hole communicating the sea. An anti-motion bottom hatch cover that can be opened and closed is either set or not on the damping hole to make the anti-motion sub-cabin as an anti-motion gas-floating cabin or an anti-motion airtight floating cabin.

As an implementable, for the CFEC 600 without need of the buoyancy and stability from the anti-motion structure 214 or 225, or with need of the buoyancy and stability just from some anti-motion floating sub-cabins of the anti-motion structure 214 or 225, all the anti-motion sub-cabins or at least symmetrically selected two anti-motion sub-cabins are provided with at least one damping hole connecting to the sea on both top plate and bottom plate respectively to make the interior of the anti-motion sub-cabin with direct access to sea all the time.

Furthermore, for the CFFECs 610 which need the buoyancy and stability provided by the all or partial sub-cabins of the anti-motion structure 214, a bottom damping plate 212 is installed at the bottom of the central entrained water/gas-float compartment 215 or the bottom entrained water/gas-float compartment 216, and no vertical radial or annular watertight partition is set within said compartments 215 or 216.

The fixed extended cylinder 21 of the CFFEC 610 without moon pool 11 adopts a single-layer structure, which is the extension of the outer cylinder wall of the upright buoy 1, and its bottom damping plate 212 is circular with a damping hole at the center.

The fixed extended cylinder 21 of the CFFEC 610 with moon pool 11 adopts a double-layer structure, of which, the outer layer is an extension of the outer cylinder wall of the upright buoy 1, and the inner layer is an extension of the cylinder wall of the moon pool 11 of the upright buoy 1. The bottom damping plate 212 is ring-shaped with two damping holes symmetrically arranged. Alternatively, for the CFFEC-B 612, its upper segment of the inner layer cylinder of the double-layered fixed cylinder 21, i.e., the hole cylinder 2163, is canceled and the lower segment of the inner layer cylinder, i.e., the cylinder of the bottom moonpool 2166, is reserved.

One or two bottom hatch covers that can be opened and closed are set or not set on the above-mentioned one or two damping holes of the bottom damping plate 212 to make the central entrained water/gas-float compartment 215 or the bottom entrained water/gas-float compartment 216 be a gas-floating compartment or an airtight floating compartment.

For the CFECs 600 which need the buoyancy and stability provided by the all or partial sub-cabins of the anti-motion structure 214 or 225, during the dry-dock construction, launch and wet tow, close the top valve of the anti-motion inflation/exhaust pipe of each sub-cabin, open the damping hole of each sub-cabin bottom to connect to the sea to make the sub-cabin as an anti-motion gas-floating cabin, or close the damping hole to make the sub-cabin as an anti-motion airtight floating cabin to provide the required buoyancy and stability. Obviously, the safety and operability of the anti-motion airtight floating cabin will be superior to the anti-motion gas-floating cabin during the wet tow.

For the CFECs 600 which need the buoyancy and stability provided by the all or partial sub-cabins of the anti-motion structure 214 or 225, when it arrives at the offshore destination and the installation starts, make the anti-motion floating cabin connect to the sea through the damping hole of the cabin bottom, open the top valve of the anti-motion inflation/exhaust pipe to make seawater poured in the anti-motion gas-floating cabin through its bottom damping hole, or pump ballast seawater into the anti-motion gas-float cabin to make the CFEC 600 go down, or pump ballast seawater firstly, then open the bottom hatch cover and open the top valve, make the CFEC 600 go down slowly and gradually and the cabin full of seawater until the upright buoy 1 providing the required buoyancy and the installation finished. When the CFEC 600 needs relocation and the anti-motion gas-floating cabin or the anti-motion airtight floating cabin is needed to provide the buoyancy again, inflate air though the anti-motion inflation/exhaust pipe to discharge the seawater inside the anti-motion gas-floating cabin or pump out the seawater out of the anti-motion airtight floating cabin or use a combination of both above-mentioned methods to realize floating upwards.

In order to improve the hydrodynamic performance of the CFEC 600 of this invention, wherein, as an optimized embodiment of the CFFEC 610, a bottom damping plate 212 with one or more damping hole is installed on the bottom opening of each central or bottom entrained water/gas-floating compartment of the fixed cylinder 21; as another optimized embodiment of the CFSEC 620, a sliding cylinder bottom damping plate 224 with one or more damping hole is installed on the bottom opening of the outmost sliding extended cylinder 221 of the sliding cylinder 22, and a moonpool hole is set at the center of the sliding cylinder bottom damping plate 224 for the CFSEC 620 with the moonpool.

The CFEC 600 of this invention is convenient for lowering its center of gravity with the help of fixed ballast. As an embodiment, the fixed ballast compartment 213 is set at the inner bottom and/or the outer wall bottom heel of the fixed cylinder 21 of the CFFEC 610. At the same time, the fixed ballast compartment 213 cannot block the opening of the central entrained water/gas-float compartment 215 or the bottom entrained water/gas-float compartment 216. As an embodiment, the sliding cylinder fixed ballast compartment 226 is set at the inner bottom and/or the outer wall bottom heel of the sliding cylinder 22 of the outmost sliding extended cylinder 221 of the CFSEC 620.

The CFEC 600 is limited within a small area at the water surface by a positioning system 3. The positioning system includes two kinds of the mooring system 31 and the DP system, of which, one of two combined is used for the CFEC 600. If the mooring system 31 selected, the fairlead 311 of the mooring system of the CFFEC 610 is installed on the upright buoy 1 at its outer cylinder wall near bottom, or on the fixed extended cylinder 21 at its outer cylinder wall bottom. The fairlead 311 of the mooring system of the CFSEC 620 is installed on its sliding extended cylinder 22 at the top outer wall of the upright buoy's sliding extended cylinder 222 (i.e., the sliding extended cylinder adjacent to the upright buoy). Furthermore, as another embodiment, the fairlead 311 is installed on the outside of the locking seat 2292 of the upright buoy's sliding extended cylinder 222, which has an advantage to transmit the mooring load to the buoy 1 more easily.

As to the CFFEC 610 which relies on the buoyancy and stability from the anti-motion structure during wet tow, how to ensure the required stability during its offshore installation sinking and relocation refloating?

As to the CFFEC 610 which relies entirely or mainly on the anti-motion structure 214 of the fixed cylinder 21 as floating cabin, or only on the central entrained water/gas-float compartment 215 or the bottom entrained water/gas-float compartment 216 as floating compartment, to provide the required buoyancy and stability for in-dock floating and wet tow, as an optimized embodiment, the central entrained water/gas-float compartment 215 or the bottom entrained water/gas-float compartment 216 of the CFFEC 610 is set with the bottom damping plate at the bottom opening and without any vertical radial or circular watertight partitions, which means the compartment 215 and 216 having only a single layer of cylinder and no sub-compartment. For the CFFEC 610 without the moonpool, its fixed extended cylinder 21 can also have only a single layer of cylinder which can be regarded as an extension of the outer cylinder of the upright buoy 1, and the circular damping plate 212 with a damping hole at the center is set at the bottom opening of the fixed cylinder 21. For the CFFEC 610 with the moonpool, its fixed extended cylinder 21 can have double layers of cylinder, of which, the outer one is as the extension of the outer cylinder of the upright buoy 1 and the inner one is as the extension of the moonpool 11, and the annular damping plate 212 with two symmetrical damping holes is set at the bottom opening of the fixed cylinder 21; as an improvement of the CFFEC-B 612, take out the upper segment of the inner layer cylinder of double layers of the fixed extended cylinder 21, i.e., the segment of the hole cylinder 2163, and remain the lower segment, i.e., the cylinder of the bottom 2166, and the above-mentioned one or two damping holes of the bottom damping plate 212 can be set or not set the movable bottom hatch cover, so that the compartment 215/216 be a gas-floating compartment or a airtight floating compartment, whose function and operation mode are the same as that of the anti-motion gas-floating cabin and the airtight cabin.

The anti-motion gas-float cabin can solve the stability in the process of wet tow and keep the displacement of the platform invariant during the platform sinking through bottom water flooding to reduce the gas volume inside the cabin. However the platform waterplane area will suddenly change once the platform going downwards and top of the anti-motion structure flush with the water surface, which will inevitably lead to a serious stability problem. At this time, the platform waterplane area is only the waterplane area of the central entrained water/gas-float compartment 215 for the CFFEC-C 611, while the platform waterplane area can be 0 for the CFFEC-B 612 because of its hole cylinder 2163 above the bottom entrained water/gas-float compartment 216. Therefore, the invention designs an up-down movable ring buoy-group to provide the required stability for the column floater in the process of the offshore installation and relocation.

The ring buoy-group consists of several construction buoys with the same structure, and the adjacent two construction buoys can be connected or disconnected by at least one chain/cable. The construction buoys are evenly distributed, and snugly surrounded the outer wall of the underwater segment of the column floater cylinder to form a ring buoy-group through the method of onshore pre-installation or offshore site-installation. The static contact force between each construction buoy and the outer wall of the column floater cylinder is very small, even zero. The construction buoys and their connected chain/cable shall avoid the fairlead and other protruding structures on the cylinder wall to ensure that the ring buoy-group and the column floater cylinder can relatively move up and down in a barrier-free manner in the process of the column floater sinking and refloating. The ring buoy-group floats at the water surface all the time of the process. The size and number of the construction buoy of the ring buoy-group shall meet the inertia moment of the waterline area required for the stability of the offshore installation and relocation of the column floater.

After the installation or relocation finished, unlock a shackle of the chain/cable between any two construction buoys, the ring buoy-group will be disconnected and presented with to a 'one line' shape, and then can be towed off the column floater by a tug. The construction buoy of the ring buoy-group is a vertical cylindrical tank sealed with flat-plate head at both ends, and a layer of weighting concrete is laid at the inner bottom of the tank to ensure the center of buoyancy above the center of gravity when each construction buoy and the ring buoy-group float at water surface. Steel or fiberglass is recommended for the construction of the construction buoy.

The CFEC 600 of this invention has excellent hydrodynamic performance, and its mechanism lies in: 1) The top of the anti-motion structure of the invention is located at the water depth of very low wave influence because of the down-extended cylinder, and said water depth is normally 30~40 meters. Therefore, while fully exerting the advantages of increasing added mass of entrained water, natural period and motion damping by the anti-motion structure, it significantly reduces the wave-induced loads on the anti-motion structure and overcomes the disadvantages of a small water depth of the anti-motion structure of the existing cylindrical floating platform. 2) The added mass of the entrained water produced by the down-extended cylinder and the anti-motion structure will greatly increase the mass of the entrained water which includes the mass of the entrained water inside and outside the compartment of the down-extended cylinder and the cabin of the anti-motion structure, and thus the motion natural period increases accordingly. Of which, the total quality of the inside entrained water may exceed the displacement of the upright buoy. Therefore, the compartment of the down-extended cylinder and the cabin the anti-motion structure is also called the entrained water compartment and the entrained water cabin respectively. 3) The down-extended cylinder increases the motion damping. The damping holes of the down-extended cylinder and the anti-motion structure will further enhance the motion damping. For further improvement of the hydrodynamic performance of the present invention and reducing the negative impact of VIM, and similar to the spar platform, helical vortex-reducing side plates can be installed on the outer wall of the cylinder without damping holes, such cylinder as the outer cylinder of the upright buoy 1 and fixed extended cylinder 21 of the CFFEC-C 611 and so on. In conclusion, the CFEC 600 of this invention, regardless of its scale and displacement, draught depth, its hydrodynamic performance can reach or exceed the spar platform.

The CFEC of this invention can realize the whole platform as one-piece be constructed, installed and commissioned at the shipyard at one time and then transported by dry tow or wet tow to the offshore destination, greatly saving the project investment and the time schedule. In short, the CFEC of this invention is a new type floating platform with multi-purpose, combining advantages of the spar platform and the current cylindrical FPSO, high performance, safety, reliability and good economy.

The invention claimed is:

1. A column floater with extended cylinder comprising:
   an upright buoy, with two ends of top plate and bottom plate, which floats on a water surface, wherein a top of the column floater is above the water surface and a moonpool is or is not set in a center of the column floater through the top to a bottom;
   an extended cylinder(s), comprising at least one layer of cylinder connected to a bottom plate of the upright buoy and extending downwards with an opening at a bottom, wherein the extended cylinder(s) have a same vertical central axis, and an anti-motion structure is installed around a bottom heel of an outer wall of an outermost extended cylinder; wherein the extended cylinder is a fixed cylinder and its outermost cylinder has a same outer diameter as an outer diameter of an outermost layer of the upright buoy, forming a column floater with a fixed extended cylinder, or the extended cylinder is a sliding cylinder and its outermost cylinder has an outer diameter larger than the outer diameter of the outermost layer of the upright buoy, forming a column floater with a sliding extended cylinder;
   wherein the fixed extended cylinder is in a watertight connection to the bottom plate of the upright buoy to form a column floater with fixed extended cylinder with central entrained water/gas-floating compartment or a column floater with fixed extended cylinder with bottom entrained water/gas-floating compartment;
   wherein at a top of the central entrained water/gas-float compartment and a top of the bottom entrained water/gas-float compartment, an inlet/outlet pipe installed upwards and plugging into an interior of or further penetrating a top of the upright buoy, and a valve is set in an upper part of an inflation/exhaust pipe, wherein a horizontal bottom damping plate is either or not set at a bottom of both the bottom entrained water/gas-float compartment and the central entrained water/gas-float compartment; and
   wherein the sliding extended cylinder of the column floater is at least one layer of cylinder sleeved on an outer wall of the upright buoy which have a same perpendicular axis through a center, and the upright buoy can be with or without an outmost fixed extended cylinder; wherein a layer cylinder of each sliding extended cylinder is set or not set multiple damping holes;
   a positioning system being a mooring system;
   a topsides located on the top and/or in the interior of the upright buoy.

2. The column floater with extended cylinder according to claim 1, wherein the upright buoy comprises at least one layer of upright cylinder with a same perpendicular central axis and at least two layers of horizontal plates in watertight connection to the cylinder, wherein the horizontal plates comprises a top plate and a bottom plate; the outer layer wall of the upright buoy is a cylinder, or a lower part of the outer wall of the upright buoy is a cylinder protruding out of the water surface and the upper part is a conical cylinder with its upper opening area larger than its lower opening area.

3. The column floater with extended cylinder according to claim 1, wherein the upright buoy comprises an outer cylinder and at least one inner upright cylinder with a common vertical center axis, and at least two layers of horizontal plates with watertight connections to the cylinders, wherein the horizontal plates comprises a top plate and a bottom plate and the outer cylinder is divided into four sections from bottom to top, which are respectively an underwater cylinder, a water surface conical cylinder with an upper opening area less than a lower opening area, an above-water cylinder, and a top cone cylinder with the upper opening area larger than the lower opening area, wherein during production operations of the column floater with extended cylinder, the water surface is always located at the water surface conical cylinder for ice-resistance.

4. The column floater with extended cylinder according to claim 1, wherein the upright buoy comprises at least three cylinders which are connected closely or with spacing to each other by the top plate and the bottom plate at both ends forming an integral structure, namely multi-cylinder buoy, wherein the bottom plate of the multi-cylinder buoy is a circle or a circular ring, and a diameter of the circle or an outside diameter of the circular ring is equal to or greater than a diameter of a circumscribed circle of the multi-cylinder buoy, and an inside diameter of the circular ring is equal to an inscribed circle of the multi-cylinder buoy thus forming a circular hole to be a bottom outlet of the moonpool of the upright buoy.

5. The column floater with extended cylinder according to claim 1,
   wherein a bottom solid ballast compartment may be either or not provided at the bottom of the bottom entrained water/gas-float compartment and the central entrained water/gas-float compartment, and the bottom solid ballast compartment shall not block bottom openings of the bottom entrained water/gas-float compartment and the central entrained water/gas-float compartment;
   wherein a plurality of central compartment vertical radial partition of are either or not symmetrically set in watertight connection with the bottom plate of the upright buoy and one or multiple layer cylinders of the fixed extended cylinder, thereby forming at least one central entrained water/gas-float compartment with airtight-top and open-bottom, wherein if the moonpool is provided in the center of the upright buoy, an innermost layer cylinder of the fixed extended cylinder becomes an integral part of the moonpool;

and wherein a bottom compartment horizontal partition, or a bottom compartment conic partition with downward opening is arranged with the watertight connection to an inner lower part of at least one layer cylinder of the fixed extended cylinder of the column floater with fixed extended cylinder with bottom entrained water/gas-floating compartment to divide the fixed extended cylinder into two parts, naming the upper part is a hole cylinder which is provided with distributed damping holes and/or bottom square hole on the wall to make internal and external waters connected to each other; and the lower part is a bottom entrained water/gas-float compartment which is formed by at least one layer cylinder of the bottom compartment cylinder with water-tight connection to the bottom compartment horizontal partition or the bottom compartment conic partition with downward opening, wherein if the moonpool is set in the center of the upright buoy (1), the innermost layer cylinder of the bottom entrained water/gas-float compartment is a bottom moonpool up-and-down penetrating the compartment, wherein inside the bottom entrained water/gas-float compartment, several vertical radial partitions may either be or not arranged with water-tight connection to the cylinder, as well as the bottom compartment horizontal partition or the bottom compartment conic partition with downward opening, thus forming at least one entrained water/gas-float sub-compartment with an airtight top and an open bottom.

6. The column floater with extended cylinder according to claim 5, wherein when the column floater with fixed extended cylinder is in-dock construction, being launched or wet towed, a top valve on the inflation/exhaust pipe is closed, and all or partial inner space of the central entrained water/gas-float compartment or the bottom entrained water/gas-float compartment is filled with air to form a floating tank in the water and provide a required buoyancy for the column floater with extended cylinder;

wherein when the column floater with extended cylinder is already towed to an offshore destination and starting offshore installation, the top value on the inflation/exhaust pipe is opened to discharge the air by seawater pressure, and the column floater with extended cylinder is gradually sinking, the central entrained water/gas-float compartment or the bottom entrained water/gas-float compartment is filled with sea water until the upright buoy provides buoyancy for the column floater with extended cylinder to complete the offshore installation;

wherein during offshore production operations survival conditions, the central entrained water/gas-float compartment or the bottom entrained water/gas-float compartment is full of sea water and the upright buoy provides buoyancy for the column floater with extended cylinder all time;

and wherein when the column floater with extended cylinder needs relocation to make the central entrained water/gas-float compartment or the bottom entrained water/gas-float compartment to provide buoyancy again, fill air through the inflation/exhaust pipe to discharge the sea water from the central entrained water/gas-float compartment or the bottom entrained water/gas-float compartment to regain the required buoyancy.

7. The column floater with extended cylinder according to claim 5, wherein the column floater with the fixed extended cylinder with bottom entrained water/gas-float compartment is a column floater with fixed extended cylinder with bottom entrained water/gas-float compartment for an aquaculture floating cage or a column floater with fixed extended cylinder with bottom entrained water/gas-float compartment for non-aquaculture.

8. The column floater with extended cylinder according to claim 7, wherein the upright buoy of the floating cage comprises only two layers of cylinder with a same central vertical axis the outer cylinder, and the inner cylinder forming a moonpool, as well as at least two horizontal plates including a top plate and a bottom plate which are in watertight connection with the two layers of cylinder; wherein a seawater ballast tank/buoyancy empty tank is arranged between the outer cylinder and the inner cylinder, and the topsides is located in the buoyancy empty tank and/or at the top of the upright buoy; wherein the top opening of the moonpool is installed an openable grid, and a plurality of horizontal connection pipes are uniformly are set or not set in an underwater part of the upright buoy so that the moonpool can be connected to external seawater in a horizontal direction; wherein the hole cylinder is only one cylinder and its bottom is symmetrically provided with a plurality of lower square holes whose bottom edge is connected to the conic partition with downward opening, and a rest upper part of the hole cylinder above the lower square holes is symmetrically provided with a plurality of damping holes;

and wherein the bottom entrained water/gas-float compartment is composed of a bottom compartment cylinder and a conic partition at its top, wherein the bottom compartment cylinder consists of at least two layers of cylinder including the outermost cylinder and the cylinder of the bottom moonpool, and the diameter of the bottom moonpool is smaller than the diameter of the moonpool, and the bottom damping plate is arranged at the bottom opening of the bottom compartment cylinder; wherein a grid is provided to plug each of damping hole, bottom square hole, the top opening of the bottom moonpool and the top opening of each bottom-up pipe.

9. The column floater with extended cylinder according to claim 7, wherein the bottom compartment horizontal partition is set with watertight connection to a lower portion inside the fixed extended cylinder of the column floater with the fixed extended cylinder with bottom entrained water/gas-float compartment for non-aquaculture and an upper portion above the bottom compartment horizontal partition is a hole cylinder uniformly distributed damping hole in its entire wall.

10. The column floater with extended cylinder according to claim 1, wherein when the column floater with sliding extended cylinder is constructed, installed, tested and pre-commissioned in one piece at shipyard, all layer cylinders of each sliding extended cylinder are lifted upwards so that a bottom of each layer cylinder is slightly below the bottom of the upright buoy and then temporarily fixed, and when the column floater with sliding extended cylinder arrives at sea destination for installation, starting from an outmost sliding extended cylinder to the upright buoy's sliding extended cylinder, to relieve the temporary fixation and rely on their own gravity to make each sliding extended cylinder drop and extend one by one, then make upper and lower adjacent layers of each sliding extended cylinder or the upright buoy connect to each other end to end and fix to each other through sliding cylinder locking mechanism, thus the column floater with sliding extended cylinder becomes a longer, draft and upright floating platform during in-place conditions;

and wherein when the column floater with sliding extended cylinder is relocated, starting from the outermost sliding extended cylinders, unpin the sliding cylinder locking mechanisms and lift them upwards one by one until the bottom of all layers of sliding extended cylinders are slightly below the bottom of the upright buoy and then temporarily fix to accommodate towing.

11. The column floater with extended cylinder according to claim 10, wherein an upright buoy bottom flange ring is connected to the outer wall of the bottom of the upright buoy or the outer wall of the fixed extended cylinder;

wherein a cylinder bottom flange ring and a cylinder top flange ring are respectively connected to the outer wall of the bottom and an inner wall of the top of each layer cylinder of the sliding extended cylinder, and an inner diameter of each layer extended cylinder is equal to the outer diameter of its upper adjacent upright buoy bottom flange ring, or, is equal to the outer diameter of its upper adjacent cylinder bottom flange ring, to guarantee that each sliding extended cylinder can slide up and down;

wherein an inner diameter of a top inner flange ring of the sliding extended cylinder is equal to or larger than the outer diameter of the upper adjacent upright buoy or the sliding extended cylinder, and the inner diameter of the cylinder bottom flange ring is smaller than the outer diameter of its upper adjacent upright buoy or the sliding extended cylinder, and the outer diameter of the cylinder bottom flange ring of the outmost sliding extended cylinder is equal to the outer diameter of its own cylinder, and an outer diameter of the cylinder bottom flange ring of other layers is slightly larger than the outer diameter of sliding extended cylinder of its own layer cylinder;

wherein when the column floater with sliding extended cylinder is in-dock construction, being launched or wet towed, a top inner surface of the cylinder bottom flange ring of each layer sliding extended cylinder contacts the bottom surface of its upper adjacent upright buoy bottom flange ring, or contacts the bottom surface of its upper adjacent cylinder bottom flange ring;

and wherein when the column floater with sliding extended cylinder is in-place, each layer of sliding extended cylinder is lowered down one by one until the bottom surface of the cylinder top flange ring contacts the top surface of the upright buoy bottom flange ring, or contacts the top surface of the upper adjacent layer cylinder bottom flange ring.

12. The column floater with extended cylinder according to claim 10, wherein a sliding cylinder fixed ballast compartment is set at an inner bottom and/or the outer wall bottom heel of the sliding cylinder of the outmost sliding extended cylinder of the column floater with sliding extended cylinder.

13. The column floater with extended cylinder according to claim 10, wherein a sliding cylinder bottom damping plate with one or more damping hole is installed on the bottom opening of the outmost layer sliding extended cylinder of the sliding cylinder of the column floater with sliding extended cylinder.

14. The column floater with extended cylinder according to claim 10, wherein a fairlead of the mooring system of the column floater with sliding extended cylinder is installed on its sliding extended cylinder at the top outer wall of the upright buoy's sliding extended cylinder.

15. The column floater with extended cylinder according to claim 11, wherein the column floater with sliding extended cylinder is a retractable sliding floating cage for aquaculture, wherein the upright buoy bottom flange ring is connected to a bottom outer periphery of the outer wall of the upright buoy of the retractable floating cage, the upright buoy of the retractable floating cage only contains two layers of cylinders with a same vertical center axis: an outer cylinder and an inner cylinder of the moonpool, a space between said two layers is seawater ballast compartment/buoyancy empty compartment, and the topsides are located in the buoyancy empty compartment and/or on the top of the upright buoy; wherein the top opening of the moonpool is provided with a openable grid, or one or two layers of mesh fabric, a plurality of horizontal connection pipes are uniformly set or not set in an underwater part of the upright buoy of the retractable floating cage, and if set, the moonpool is connected to external seawater in a horizontal direction;

wherein the sliding extended cylinder of the retractable floating cage is composed of a cylinder skeleton, a layer mesh fabric fixed on an internal side of the skeleton or two layer mesh fabric fixed on both internal and external sides of the skeleton, and the cylinder bottom flange ring and the cylinder top flange ring of the sliding extended cylinder are connected with the cylinder skeleton to form a solid integral structure;

wherein the bottom opening of the outmost sliding extended cylinder is covered with one or two layers of mesh fabric or a sliding cylinder bottom damping plate which has a number of sliding cylinder bottom damping holes;

and wherein the upright buoy of the retractable floating cage usually floats on the water surface during production operations, and is submerged under water in a set depth in case of unfavorable environmental conditions; and in fishing operations, each cylinder of the sliding extended cylinder of the retractable floating cage may be lifted up one by one to a highest position and then fixed to facilitate deployment of the fishing operations.

16. The column floater with extended cylinder according to claim 1, wherein an interior of anti-motion structures can be divided into multiple sub-cabins, whose vertical radial crossing section is shaped as a watertight square-box with a circular horizontal bottom plate, which means a plurality of radial vertical partitions are arranged inside the anti-motion structure, and said radial vertical partitions, the top structure, inner/outer circular vertical structures and the circular horizontal bottom plate of the anti-motion structure are connected to each other to form a plurality of symmetrical and uniform water-tight sub-cabins;

wherein for the column floater with extended cylinder which needs buoyancy and stability provided by all or partial sub-cabins of the anti-motion structure, each said sub-cabin providing buoyancy and stability is an anti-motion floating cabin and an anti-motion inflation/exhaust pipe with a top valve is set at the top plate of the anti-motion floating cabin, and the center of the horizontal bottom plate of each said anti-motion floating cabin shall be provided with a damping hole connecting to sea, and an anti-motion bottom hatch cover that can be opened and closed is set or not set on the damping hole to make the anti-motion cabin as an anti-motion gas-floating cabin or an anti-motion airtight floating cabin;

and wherein for the column floater with extended cylinder without need of the buoyancy and stability from the anti-motion structure, or with need of the buoyancy and stability just from some anti-motion floating sub-cabins of the anti-motion structure, all the anti-motion sub-cabins or at least symmetrically selected two anti-motion cabins are provided with at least one damping hole connecting to the sea on both top plate and bottom plate respectively to make the interior of each anti-motion cabin with direct access to the sea all the time.

17. The column floater with extended cylinder according to claim 16, wherein a bottom damping plate is installed at the bottom of the central entrained water/gas-float compartment or the bottom entrained water/gas-float compartment, and no vertical radial or annular watertight partition is set within said compartments;

wherein the fixed extended cylinder of the column floater with fixed extended cylinder without moon pool adopts a single-layer structure, which is an extension of the outer cylinder wall of the upright buoy, and its bottom damping plate is circular with a damping hole at a center;

wherein the fixed extended cylinder (21) of the column floater with fixed extended cylinder with moon pool adopts a double-layer structure, of which, the outer layer is an extension of the outer cylinder wall of the upright buoy, and an inner layer is an extension of the cylinder wall of the moon pool of the upright buoy, and the bottom damping plate is ring-shaped with two damping holes symmetrically arranged, alternatively, for the column floater with fixed extended cylinder with bottom entrained water/gas-float compartment, its upper segment of the inner layer cylinder of the double-layered fixed cylinder is canceled and a lower segment of the inner layer cylinder is reserved;

and wherein one or two bottom hatch covers that can be opened and closed are set or not set on the at least one damping hole of the bottom damping plate to form a gas-floating compartment or an airtight floating compartment.

* * * * *